United States Patent Office 2,840,594
Patented June 24, 1958

2,840,594

POLYETHOXY TERTIARY-ALKYL BENZOATES

Joseph F. Coates, Philadelphia, and Robert M. Lincoln, Media, Pa., assignors to The Atlantic Refining Company, Philadelphia, Pa., a corporation of Pennsylvania No Drawing. Application September 4, 1956
Serial No. 607,549

5 Claims. (Cl. 260—476)

This invention relates to low-foaming synthetic non-ionic detergents and methods of preparing same. More particularly this invention relates to polyethoxy mono- and poly-tertiary alkyl benzoates, and mixtures of same, wherein the tertiary alkyl group or groups are directly substituted on the benzene ring.

It is known in the art that non-ionic synthetic detergents of the ethylene oxide condensate type have high detergency-low foam characteristics which make them particularly suitable for home laundry and dishwashing machines, as well as for many industrial purposes. The products of the instant invention possess these characteristics to a superior extent.

It is therefore an object of this invention to produce non-ionic synthetic detergents having superior detergency properties.

It is another object of this invention to produce non-ionic synthetic detergents having very low foam characteristics.

It is another object of this invention to produce synthetic detergents which can be readily and economically spray dried or drum dried with builders to yield a powdered product having the desired high detergency-low foam properties.

Other objects and advantages will become apparent from a reading of the following description and the appended claims.

It has been discovered that the novel non-ionic synthetic detergents of this invention possess high detergency-low foam properties to a superior extent and that when combined with builders they can be readily and economically spray dried or drum dried to form powders. In accordance with the present invention, a benzoic acid having from 1 to 4 nuclear hydrogens substituted by a tertiary alkyl group containing from 4 to 16 carbon atoms, wherein the total number of carbon atoms in the alkyl substituents ranges from 4 to 16, is condensed with ethylene oxide in the presence of an alkaline catalyst, preferably an alkali metal hydroxide, at a temperature of from approximately 100° C. to 200° C., until the mole ratio of ethylene oxide to the acid is from about 4:1 to about 30:1. Mole ratios of ethylene oxide to acid of 11:1 to 19:1 are preferred, with the best results being obtained when the mole ratio is from 16:1 to 18:1. Although the condensation reaction may be carried out at temperatures ranging between 100° C. and 200° C., it is preferable to carry out the reaction at temperatures from 140° C. to 180° C.

Instead of producing the ester by condensation of the acid with ethylene oxide, the mono- or poly-tertiary alkyl benzoic acids may be esterified directly with equimolar quantities of polyethylene glycols ranging in average molecular weight from about 550 to about 1000, with those having an average molecular weight of about 600 being the most preferred. The esterification is carried out at a temperature of from approximately 130° C. to 190° C. in the presence of from about 0.1 weight percent to about 0.5 weight percent of a highly acidic catalyst such as a sulfonic acid catalyst, xylene sulfonic acid being preferred. Athough the catalyst may be omitted, the reaction time is considerably shortened in its presence.

The polyethoxy mono- and poly-tertiary alkyl benzoates thus produced have the general formula

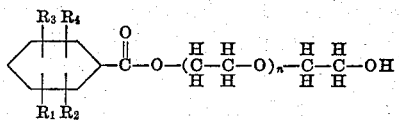

wherein $R_1$, $R_2$, $R_3$ and $R_4$ may be either hydrogen atoms or tertiary alkyl groups. The number of hydrogen atoms should not exceed three and the sum of the carbon atoms in the tertiary alkyl groups should not exceed 16. The value of $n$ may range from about 3 to about 29 with values from 10 to 18 being preferred and with values from 15 to 17 being the most preferred range. Examples are polyethoxy mono-tertiary butyl benzoate, polyethoxy di-tertiary butyl benzoate, polyethoxy tri-tertiary butyl benzoate, polyethoxy tertiary octyl benzoate, polyethoxy mono-tertiary nonyl benzoate, polyethoxy propyl benzoate.

Exceptionally high detergency values have been obtained consistently from the condensation product of ethylene oxide with $C_8$ alkyl benzoic acid. The acid is prepared by the oxidation of $C_8$ alkyl toluene. The latter, in turn, is the alkylation product from the $AlCl_3$ catalyzed reaction of toluene and diisobutylene.

Ethylene oxide may be added to mono, di, or higher tertiary alkyl benzoic acids or any combination thereof, to give condensates of good to excellent detergency. The acid is placed in a glass or stainless steel apparatus, catalyst added, and the reactor is heated to 140° C. to 180° C. When the mixture is sufficiently hot and therefore mobile, the passage of ethylene oxide through a disperser such as a sintered glass disc is begun. Addition is slow at first. After the first mole of ethylene oxide has been added, the rate picks up several fold. It is generally believed that ethylene oxide adds to the most acidic function first, and when all such acidic functions are consumed, addition begins on the terminal hydroxyl group, which is more rapid. The rate of addition also increases as the temperature rises.

The catalyst used may be any basic catalyst such as KOH, LiOH, NaOH, metallic sodium or a mixture of sodium hydroxide and sodium glycerophosphate. Alkali metal hydroxides are preferred. The catalyst may be added in an aqueous solution or in solid form, but it is preferred to use solid catalysts. About 1 weight percent to about 13 weight percent of the catalyst, based on the acid, may be used, 1 weight percent to 4 weight percent being preferred.

The final condensation product has a characteristic odor which may be removed by blowing the hot mixture with nitrogen at atmospheric pressure or under vacuum. An alternative is to steam strip the odor from the hot mix, or to treat with benzene and strip off the latter.

The color in the final non-ionics may be reduced or bleached with from 1 to about 5 volume percent of 30 percent aqueous hydrogen peroxide.

Various salts and suspending agents may be added to the pure detergent of this invention to augment its detergency. These are termed "builders" and are usually phosphates, silicates, sulfates, carboxymethyl cellulose, and a wide variety of other materials. Built formulations prepared from the products of the instant invention gave excellent high detergency-low foam results as will be shown hereinafter. The following builder formulation was used to evaluate the detergency of the polyethoxy tertiary alkyl benzoates in the present invention:

15% by weight polyethoxy tertiary alkyl benzoate
50% by weight sodium tripolyphosphate
33% by weight sodium sulfate
2% by weight carboxymethyl cellulose The synthetic detergents of this invention may be spray dried or drum dried with builders to form powders. In spray drying the built detergents slurry is pumped to the top of a high tower and fed in a series of sprays at a temperature of about 150° F. The droplets are met by a concurrent stream of high temperature gas at 550° F. to 650° F. inlet and 250° F. to 300° F. outlet which evaporates the water from the droplets leaving them in the form of solid detergent particles on falling. Drum drying of the built detergent slurry may be accomplished in conventional equipment using about 100 pounds steam pressure in the drums.

As previously stated, the non-ionic synthetic detergents of the instant invention may also be prepared by directly esterifying the mono- and poly-tertiary alkyl benzoic acids with equimolar quantities of polyethylene glycol. The polyethylene glycol may range in average molecular weight from about 550 to about 1000, with those having an average molecular weight of about 600 being preferred. The esterification temperature may range from approximately 130° C. to approximately 190° C. The reaction may be carried out with or without a catalyst, but in order to increase the reaction rate it is desirable to employ a highly acidic catalyst such as a sulfonic acid catalyst, preferably xylene sulfonic acid, in an amount varying from about 0.1 weight percent to about 0.5 weight percent. The reaction time varies from about 4 hours to about 28 hours.

The tertiary alkyl benzoic acids which are condensed with ethylene oxide or esterified with polyethylene glycol to form the polyethoxy tertiary alkyl benzoates of the instant invention may be prepared by known methods, for example by the oxidation of tertiary alkyl toluene with a free oxygen-containing gas in the presence of a cobalt naphthenate or manganese naphthenate catalyst. The acids produced by this oxidation step may be used either undistilled or distilled with the distilled acids being preferred. The tertiary alkyl toluene may be a mono- or poly-tertiary alkyl toluene or mixtures of same, but it is preferred to utilize those alkylates having a boiling range above mono-tertiary alkyl toluene. The alkylate may be prepared by conventional methods, for example, by the reaction of diisobutylene or propylene polymer with toluene in the presence of an aluminum chloride or boron trifluoride catalyst. The diisobutylene is a commercially available chemical. The propylene polymer may be obtained commercially or may be manufactured, for example by contacting a gas stream comprising a major proportion of propylene with a catalyst consisting of phosphoric acid impregnated on kieselguhr at a temperature of 500° F. to 550° F. and 400 p. s. i., at a rate of about 0.1 pound mols of propylene per pound of catalyst per hour and fractionally distilling the resultant mixture of propylene polymers to give an overhead fraction comprising mainly the trimers ($C_9$ polymers) boiling between approximately 300° F. and 340° F. to 360° F., a second cut boiling up to approximately 465° F. comprising predominantly tetramers ($C_{12}$ polymers) and a distillation residue boiling up to about 520° F. and comprising the pentamers ($C_{15}$ polymers). The $C_9$ polymers are employed to make the tertiary nonyl alkylates, while the $C_{12}$ polymers are employed to make the tertiary dodecyl alkylates.

The non-ionic detergents were tested in a standard Launderometer apparatus. The procedure and method of calculating detergency values differ in minor details from that shown in "Carbon Soil Removal," P. T. Vitale et al., Soap and Chemical Specialties, vol. 32, No. 6, pp. 41–44 (June 1956), and are described below. The Launderometer consists of a spindle rotating in a hot water thermostated bath. Mason jars of 1 pint capacity containing detergent, water, soiled cloth, and balls for agitation are rotated for a set time at a set rate in the hot water. The degree of cleaning is determined and the resulting numbers are the detergency values. These values were originally correlated with a standard anionic detergent having an arbitrarily assigned detergency value and a standard nonionic detergent having an assigned detergency value based on the standard anionic detergent.

It is known that the nonionic detergents of the prior art exhibit essentially the same detergency and foam characteristics in soft water (less than 100 parts per million hardness) as in hard water (over 150–200 p. p. m. hardness). In a number of the examples which follow soft water was used in determining the detergency and foam characteristics of the nonionic detergents of the instant invention, in the remaining examples hard water was used in the determination. It will be seen that in both cases the nonionic detergents of the instant invention were superior in detergency and foam characteristics over the detergents of the prior art.

The detergency tests are conducted in the following manner:

The new cloth is washed with 2 weight percent of a commercial mild fatty acid soap to remove the sizing. It is put through 3 full rinse cycles in an automatic washer, hung to damp dry, cut into 4 inch wide strips, ironed and set in a desiccator in a temperature and humidity controlled room.

The strips of cloth are soiled with the following composition:

0.9 g. Commercial hydrogenated vegetable oil (trademarked Crisco)
3.1 g. A U. S. P. Grade mineral white oil
1.0 g. Lampblack
300 ml. Carbon tetrachloride The hydrogenated vegetable oil, mineral white oil and lampblack are mixed with sufficient carbon tetrachloride to just dissolve the oil and fat. The concentrated soil slurry is then passed through a small, hand-operated homogenizer and the balance of the carbon tetrachloride added. About 200 ml. of soil is placed in a nine inch evaporating dish and a strip of the cloth is passed through this rapidly and smoothly three times. The cloth is hung to dry at room temperature for 2 hours ± 15 minutes and is then cut into 2 inch by 4 inch swatches and read photometrically. The photometer is calibrated against a magnesia block with the standard equal to 100.

One pint Mason jars are washed and set in the Launderometer rack. They are each filled with 6 ml. of 5 percent by weight solution of the above mentioned built composition, 10 three-eighth inch diameter hard rubber balls, one soiled swatch, and enough 300 p. p. m. or 30 p. p. m. ("hard" or "soft" water, respectively) hardness water to make 100 ml. of solution. The final concentration of the built composition is 0.3 percent with the concentration of the active polyethoxy tertiary alkyl benzoate being 0.045 percent by weight. The jars are capped, set on the spindle, and rotated at 40–42 R. P. M. for 20 minutes at 120° F. The jars are immediately removed, the height of the foam above the detergent solution in each jar is immediately noted (following one quick inversion of each jar), and the swatches are dried on paper and photometer readings taken.

The detergency is calculated in the following way.

$$\text{Raw Detergency} = \frac{R-S}{V-S} \times 100 = L$$

where:

R = photometric percent reflectance of the washed cloth
S = photometric percent reflectance of the soiled cloth
V = photometric percent reflectance of the virgin cloth
S usually ranges from 18–24
V is practically a constant at 87
R varies from 40–80

The L value is then related to a standard value by a factor to give the final detergency:

$$D = L \times \frac{S_t}{L_s}$$

where:

$S_t$ = the arbitrary detergency of the standard
$L_s$ = the L (raw detergency) value for the standard which is always run concurrently with the material being tested.

An arbitrary detergency ($S_t$) of 70 is assigned to a commonly used commercial anionic detergent which is employed as the standard. A non-ionic commercial detergent is used as a secondary standard and is assigned a detergency of 80 based on the assigned value of 70 for the standard anionic.

The detergency data obtained by testing various representative compounds of this invention in the examples which follow not only demonstrate the utility of the invention, but also demonstrate the superiority of these compounds over the standard anionic and non-ionic detergents available commercially.

EXAMPLE I

Preparation of alkylate 552 moles of toluene were charged to a glass lined Pfaudler kettle. Two weight percent $AlCl_3$ were added and the mixture was heated with agitation to 66° F. 552 moles of diisobutylene having an initial boiling point of 101° C. and a dry point of 105° C., (ASTM D-1078), were added at such a rate as to maintain the desired temperature, external heating being required during the addition of the last 150 moles. The reaction mixture was cooled and the catalyst sludge discarded. The alkylate was washed successively with water, 1 percent HCl, 4 percent NaOH, and water, until neutral. The alkylate was distilled to give the fractions enumerated in Table I which were analyzed by the mass spectrometer.

Preparation of acid

A 32,650 g. portion of the pot bottoms from the distillation of the alkylate having a boiling range above mono-tertiary butyl toluene were charged to a stainless steel turbo gas absorber; six percent cobalt naphthenate catalyst in a concentration of 1.5 ml. per 100 gms. of charge was added. Air was passed in at a rate of 3.1 ml. per minute per gm. of charge. The reaction was carried out at a temperature of 160° C. to 170° C. Water and water soluble light organics amounting to 9.85 weight percent based on the charge were condensed from the effluent air.

The oxidation mixture comprising the $C_6$ to $C_{17}$ tertiary alkyl benzoic acids was taken up in 2 volumes of hexane. 110 mole percent of 5 percent NaOH solution was used to extract the hexane solution. The caustic and hexane solutions were cross washed, and the washes were combined with the corresponding phases. 110 mole percent HCl was added to the aqueous phase to acidify the base. The free organic acid was extracted with benzene and washed with water and dilute caustic. The HCl-free benzene solution was stripped of benzene. The yield was 33.3 weight percent acid on a no-loss basis based on the alkylate. The acids were distilled in several batches to give a 64.2 weight percent overhead. The bulk of the acids were combined in a composite having the following analysis:

Acid number _____ 237 mg. KOH/gm.[1]
Ester number _____ 10–20 mg. KOH/gm.
Hydroxyl number _____ 12 mg. KOH/gm.
Carbonyl _____ 1 percent.

[1] Calculated equivalent molecular weight=236, theoretical molecular weight for $C_8$ benzoic acid=234.

Ethylene oxide addition

The composited acids were charged to a stainless steel-carbon steel turbo mixer. Two weight percent pulverized KOH was added and the agitated mixture was heated to 170° C. to 175° C. Ethylene oxide was passed into the reaction mixture. An induction period of about one hour was required to reach a 1:1 mole ratio of ethylene oxide to acid. The rate of reaction accelerated at this point so that no additional external heating was required. 17.5 moles of ethylene oxide were added per mole of acid charged. Recovery was essentially quantitative. Samples were taken at each mole ratio of ethylene oxide from 8:1 to 17.5:1 and each of these was compounded into the previously described 15 weight percent active polyethoxy tertiary alkyl benzoate built detergent compositions. Table II summarizes the detergencies and foam heights at 0.3 percent concentration, in 30 p. p. m. hardness water, of the built detergent compositions.

TABLE I

| | Grams | Weight Percent | ° API | Ml. | Volume Percent | Cut Point | Composition |
|---|---|---|---|---|---|---|---|
| Cut 1 | 19,000 | 18.9 | 53.0 | 24,800 | 20.6 | 229° F. | Unreacted. |
| Cut 2 | 40,100 | 40.0 | 33.6 | 47,000 | 39.3 | 392° F. | Mono-tert-butyl toluene. |
| Bottoms | 39,500 | 39.4 | 32.2 | 45,700 | 38.2 | above 393° F. | $C_6$ to $C_{17}$ tert-alkyl toluenes predominantly Mono-tert-octyl toluene, and Di-tert-butyl toluene. |
| Recovery | 98,600 | 98.3 | | 117,500 | 98.1 | | |
| Charge | 100,500 | 100.0 | 36.5 | 119,500 | 100.0 | | |
| Loss | 1,900 | 1.7 | | 2,000 | 1.9 | | |

TABLE II

| Run Number | Moles Ethylene Oxide per Mole of Acid | Detergency at 0.3% Conc. | Foam Height (Inches) |
|---|---|---|---|
| 1 | 8 | 74 | 0 |
| 2 | 9 | 73 | 0 |
| 3 | 10 | 74 | 0 |
| 4 | 11 | 74 | 0 |
| 5 | 12 | 77 | 0 |
| 6 | 13 | 77 | 0 |
| 7 | 14 | 78 | 0 |
| 8 | 15 | 84 | 0 |
| 9 | 16 | 89 | 0 |
| 10 | 17.5 | 93 | 0 |
| 11 [1] | 18 | 84 | 2/8 |
| 12 [1] | 20 | 81 | 2/8 |
| 13 [1] | 21 | 82 | 2/8 |
| 14 [1] | 22 | 81 | 2/8 |

[1] Samples 11 to 14 were prepared by adding ethylene oxide to sample No. 10 in a glass apparatus in the presence of 2 weight percent pulverized KOH at a temperature of 170-175° C. and were tested in the same manner as Samples 1 to 10, inclusive.

These data show clearly the preferred range of mol. ratios of ethylene oxide to acid.

EXAMPLE II

Another portion of the same acid mixture used in Example I was charged to a glass reactor in different portions. Varying catalysts were employed and in varying concentrations. Temperatures ranging from 100° C. to 170° C. were employed for the different condensations. Ethylene oxide was passed in through a sintered glass disc. The products made from each run were tested for detergency and foam height at 0.3 percent concentrations, in 30 p. p. m. hardness water, of the built detergent compositions as previously described. The results are set forth in Table III below.

TABLE III

| Run Number | Moles Ethylene Oxide per Mole of Acid | M. W. Acid | Catalyst (Wt. Percent) | Temp. (° C.) | Detergency at 0.3% | Foam Height (Inches) |
|---|---|---|---|---|---|---|
| 1 | 17.8 | 236 | 2% KOH | 100 | 93 | 0 |
| 2 | 17.5 | 236 | 2% NaOH | 170 | 91 | 2/8 |
| 3 | 16.6 | 236 | 2% KOH | 170 | 86 | 2/8 |
| 4 | 15.8 | 236 | 2% KOH | 130 | 84 | 2/8 |
| 5 | 15.9 | 236 | 13% KOH | 170 | 81 | 3/8 |
| 6 | 13.6 | 236 | (2% NaOH, 5% Sodium Glycerophosphate.) | 170 | 86 | 0 |

EXAMPLE III

A 2010 g. quantity of tertiary alkyl benzoic acids ranging from $C_7$ to $C_{14}$, being predominantly tertiary octyl benzoic acid as determined by mass spectometer analysis and having an average molecular weight of 246 based on an acid number of 228 were prepared in the manner similar to that described under Example I, using manganese naphthenate instead of cobalt naphthenate as a catalyst, and were charged to a 12 liter glass flask. Forty grams of pulverized KOH were added, the agitated mixture was heated to 170° C. to 175° C. and 17.6 moles of ethylene oxide per mole of acid were passed in. On completion of the reaction the product was blown with nitrogen under vacuum at a temperature of 104° C. to 126° C. The product was mixed with 1 liter of benzene which was then stripped off. This process was repeated 5 times to reduce odor and remove unreacted low boiling materials. The color of product at this stage was a clear red. Decolorization was effected by treatment with 3 volume percent of 30 percent aqueous hydrogen peroxide at 121° C. The batch was then treated twice more with 1000 ml. portions of benzene as above and filtered to remove a faint haze. The product at this stage was a bright light amber liquid. It had a detergency value of 85 and a foam height of 1/8 inch in 300 p. p. m. hardness water and a detergency of 85 and a foam height of 1/8 inch in 30 p. p. m. hardness water at 0.3 percent concentration of the built formulation described hereinbefore. These data show that the non-ionics of the instant invention have markedly superior detergency and low foam characteristics in both hard and soft water.

A distillation fraction from another portion of the acids prepared for this example having a molecular weight of 233 (predominantly tert octyl benzoic acid) based on an acid number of 240, was condensed with ethylene oxide in the presence of 2 weight percent pulverized KOH. A total of 21 moles of ethylene oxide per mole of acid were added at a temperature of 160° C. with samples taken at intervals. Table IV sets forth the detergency values and foam heights at 0.3 percent concentration, in 30 p. p. m. hardness water of the built formulation heretofore described.

TABLE IV

| Run Number | Moles Ethylene Oxide per Mole of Acid | Detergency at 0.3% Conc. | Foam Height (Inches) |
|---|---|---|---|
| 1 | 8 | 70 | 0 |
| 2 | 11 | 82 | 0 |
| 3 | 17 | 91 | 2/8 |
| 4 | 21 | 86 | 2/8 |

EXAMPLE IV

A portion of a distilled fraction from the acid prepared in Example I having an average molecular weight of 240, based on acid number, was reacted with an equimolar quantity of commercial poly-ethylene glycol having an average molecular weight of 550. Another portion of the same acid was reacted with an equimolar quantity of a commercial polyethylene glycol having an average molecular weight of 600 in the presence of 0.1 weight percent of a xylene sulfonic acid catalyst. A third portion of the acid was reacted with an equimolar quantity of a commercial polyethylene glycol having an average molecular weight of 1000. A commercial pure monotertiary butyl benzoic acid having a molecular weight of 178 was esterified with an equimolar quantity of a commercial polyethylene glycol having an average molecular weight of 600 in the presence of 0.43 weight percent of a xylene sulfonic acid catalyst. The temperatures of the various reactions varied from 130° C. to 190° C. The reaction periods varied from 4 hours to 28 hours, heating being intermittent. The esters made from each run were tested for detergency and foam height at 0.3 percent concentration, in 30 p. p. m. hardness water, of the built formulation previously described. The results are set forth in Table V.

TABLE V

| Run No. | Moles Acid | Catalyst [2] (Wt. Percent) | Polyethylene Glycol (Carbowax) M.W. | Polyethylene Glycol (Carbowax) Moles | Temp. (° C.) | Time (Hrs.) | Detergency at 0.3% Conc. | Foam Height (Inch) |
|---|---|---|---|---|---|---|---|---|
| 1 | [1] 0.0126 |  | 550 | 0.0126 | 190 | 28 | 69 | ½ |
| 2 | [1] 0.069 | 0.1 | 600 | 0.069 | 170 | 6 | 92 | ⅝ |
| 3 | [1] 0.01 |  | 1,000 | 0.01 | 190 | 4 | 74 | ⅝ |
| 4 | [3] 0.056 | 0.43 | 600 | 0.056 | 130 | 22 | 72 | ⅔ |

[1] Distillation fraction from acid prepared under Example I having an average molecular weight of 240 based on acid number.
[2] Xylene sulfonic acid.
[3] Commercial pure mono-tertiary butyl benzoic acid.

EXAMPLE V

An 80.4 gram portion of $AlCl_3$ was added to a reaction flask containing 2679 ml. of toluene and the mixture was heated to 57° C. with agitation. An 893 ml. portion of a commercial propylene polymer comprising principally monoolefins in the $C_{11}$ to $C_{13}$ range, and having an approximately distillation range of 5 percent at 355° F. and 95 percent at 385° F., was added to the reaction mix while the temperature was maintained at 57° C. The mix was transferred to a separatory funnel and washed successively with 200 ml. of 1:1 HCl, 100 ml. $H_2O$, 100 ml. 10 percent NaOH, and 400 ml. $H_2O$. The unreacted toluene was stripped off and the alkylate was fractionally distilled. The dodecyl toluene distilled over a boiling range of 168° C. to 195° C. at 20 m. m. pressure, the main portion distilling over a range of 172° C. to 182° C. at 20 m. m. pressure and consisting of about 65 percent to about 70 percent tertiary dodecyl toluene, the remainder being secondary.

A 101 gram portion of this alkylate was oxidized with air in the presence of 1.4 ml. of cobalt naphthenate catalyst at a temperature of 170° C. to 200° C. and 14 ml. of water were collected over a period of 1 hour and 40 minutes. A total of 31.2 grams of acid was recovered which consisted of tertiary dodecyl and higher molecular weight tertiary alkyl benzoic acids. About 14.5 grams of the acid were charged to a glass reactor. Two weight percent pulverized KOH was added and the reaction mix was heated to 170° C. to 175° C. Ethylene oxide was passed in through a sintered glass disc. Samples were taken at various mole ratios of ethylene oxide to acid and each of these was compounded into the previously described 15 weight percent built detergent compositions. Table VI sets forth the detergencies and foam heights at 0.3 percent concentration in 300 p. p. m. hardness water, of the built detergent compositions.

TABLE VI

| Moles Ethylene Oxide to Mole of Acid | Detergency at 0.3% Concentration | Foam Height (Inches) |
|---|---|---|
| 8 | 70 | ½ |
| 10 | 73 | 0 |
| 13 | 72 | 0 |
| 21 | 73 | 0 |

We claim:
1. Polyethoxy tertiary alkyl benzoates having the general formula

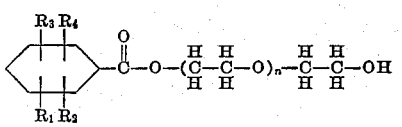

wherein $R_1$, $R_2$, $R_3$, and $R_4$ are each a radical selected from the group consisting of a hydrogen atom and a tertiary alkyl radical containing from 4 to 16 carbon atoms, the number of radicals consisting of a hydrogen atom not exceeding three and the sum of the carbon atoms in the total number of said alkyl groups not exceeding 16, and wherein $n$ has a value of from 10 to 29.

2. The products according to claim 1 in which $n$ has a value of from 10 to 18.

3. The products according to claim 1 in which $R_1$ is a tertiary octyl radical, $R_2$, $R_3$ and $R_4$ are hydrogen atoms and $n$ has a value of from 10 to 18.

4. The products according to claim 1 in which at least one of the radicals, $R_1$, $R_2$, $R_3$ and $R_4$, is a tertiary butyl group and the remainder are hydrogen atoms, and wherein $n$ has a value of from 10 to 18.

5. The products according to claim 1 in which $R_1$ is a tertiary alkyl group consisting of a propylene polymer, $R_2$, $R_3$ and $R_4$ are hydrogen atoms and $n$ has a value of from 10 to 18.

References Cited in the file of this patent

UNITED STATES PATENTS

| 1,710,424 | Loehr | Apr. 23, 1929 |
| 2,624,752 | Morris et al. | Jan. 6, 1953 |
| 2,714,607 | Matter | Aug. 2, 1955 |